July 10, 1928.                                                1,676,322
R. CHILTON
DRIVING MECHANISM
Filed Jan. 2, 1925                          4 Sheets-Sheet 2

INVENTOR
Roland Chilton
BY
Werner F. Rathermund
ATTORNEY

Patented July 10, 1928.

1,676,322

UNITED STATES PATENT OFFICE.

ROLAND CHILTON, OF KEYPORT, NEW JERSEY, ASSIGNOR, BY MESNE ASSIGNMENTS, TO HEALEY-AEROMARINE BUS COMPANY, INC., A CORPORATION OF NEW YORK.

DRIVING MECHANISM.

Application filed January 2, 1925. Serial No. 181.

This invention relates to mechanically propelled vehicles wherein one or more wheels are both steered and driven. In most road vehicles the steering is done by the mounting of the front wheels on pivotal steering heads and the principal object of this invention is to afford improved means for applying driving power to such wheels and for mounting the same.

Universal joints are utilized in the present instance to permit of the orientation of the plane of the wheels for steering purposes and one object of the invention is to provide a structure which shall permit of the use of relatively large steering angles. To this end there is featured a new disposition of the parts, whereby the angle through which the wheel driving joints are flexed is less than the angle through which the wheel is turned in steering.

A further object of this invention is to provide a universal joint structure capable of transmitting a relatively large driving effort when flexed at a relatively great angle and done which will be more compact, than the structures of the prior art. Reference to the drawings shows that at least one of the wheel bearings surrounds the universal joint and these bearings would become of impracticably large size unless some special steps were taken to reduce the size of the joint. The present form of joint constitutes an improvement over the one shown and described in my Patent No. 1,562,080.

To obtain constant velocity ratio at extreme angles, a pair of joints, each taking one-half of the angle have been used in the past. When such joints are axially separated the condition of constant velocity ratio is only satisfied when the joint pins on the shaft connecting the joints are parallel. In this invention no intermediate shaft is used, but the second joint is placed over and around the first. By this construction the previously separated but necessarily parallel axes of the joint pins of the intermediate shaft are merged into a single axis so that the compound joint has only three axes of orientation instead of four as in the case of two separate joints. The principal novel feature in the present disclosure, with reference to this part of my structure consists in combining the well-known pivoted sliding block construction which provides orientation in two directions with a cross pin joint to the driving shaft, which affords orientation in a third sense.

The drawings show a front wheel drive with a differential gear located on the axis of the vehicle and engaging on either side, through a universal joint, a drive shaft which drives the wheel through a compound universal joint located in the wheel hub. It will be seen that the center of the wheel joint is on the side of the steering pivot axis remote from the differential gear. Reference to the plan diagram showing the relationship of the parts with the wheel steered to extreme position will show that by this disposition of the parts, the axis of the shaft is orientated in the same direction as is the wheel with the result that the angle between the wheel and the vehicle axis in extreme position is greater than the angle to which the wheel joint is subjected.

It will be appreciated that when a vehicle with pivoted wheels is steered, the inner wheel must assume a greater angle than the outer wheel if the wheels are to track correctly, that is to say, the extreme travel of the right hand wheel to the right is greater than to the left and vice versa. In front wheel drives of the prior art, the drive shafts are normally at right angles to the axis of the vehicle, so that the full angular capacity of the joints is only utilized on each wheel in one direction. In the present invention on the contrary, the shafts are raked backwards towards their outer ends to an amount equal to one-half the difference between the right and left hand steering angle of the wheels. In this way the full angular capacity of each joint is realized in both directions and the wheel is enabled to be steered to a more acute angle to the vehicle than the limiting angle of the joint. By this raking back of the shafts and by positioning the wheel joint axes beyond the axis of orientation of the wheel a substantial increase in the steering angle is realized without increasing the angle between the shaft and the wheel.

In utilizing the extreme steering angles contemplated in this invention it will be seen that the frame of the vehicle, between the wheels, must be made relatively narrow to afford the necessary clearance for their movement. In the case where the road springs are placed longitudinally on either side of the vehicle at the front, these also must be placed relatively close together to permit the desired wheel turn and this would concentrate the weight undesirably near the center of an axle structure connecting the steering pivots. Further, such an axle structure, in the case of front wheel drive, would have to be offset to clear the differential or other driving mechanism. To avoid these difficulties there is featured in this invention a transversely disposed spring, in combination with longitudinally-rigid transverse radius members for the suspension of the wheels and for the maintenance of the steering pivots and the wheels in the desired alignment.

Reference to the front elevation, Fig. 4 will show that the upper steering head is supported and guided throughout the spring movement by the end of the cross spring, while the lower steering pivot is located by a laterally extending radius link having fore-and-aft rigidity. These parts are so disposed that the arcs described by the upper and lower steering pivots are parallel so that the wheel remains in the same attitude throughout the spring movement. A special feature of the disclosure is that each steering link is so disposed that the arc described by its wheel end under spring movement is parallel to the arc similarly described by the steering heads with the result that no steering tendency is imposed on the wheels when the spring is deflected.

One of the advantages of the front wheel drive consists in the fact that it permits of a lowering of the frame height of the vehicle and a relatively low frame height is one of the features associated with this invention. Such low frame position, however, would interfere with the proper movement of a conventional front axle. A further object of this invention accordingly, is to provide a structure which will avoid these interferences to a low frame position.

It is also one of the objects of the invention to so suspend the front wheels individually from either side of the vehicle as to permit either of said wheels to rise over an obstruction in a substantially vertical plane and without causing an angular deflection of the other wheel from a vertical plane.

Various other objects and advantages of the invention will be in part apparent from an inspection of the accompanying drawings and in part will be more fully set forth in the following particular description of one form embodying my invention, and the invention also consists in certain new and novel features of construction and combination of parts hereinafter set forth and claimed.

In the drawings:—

Figure 1:
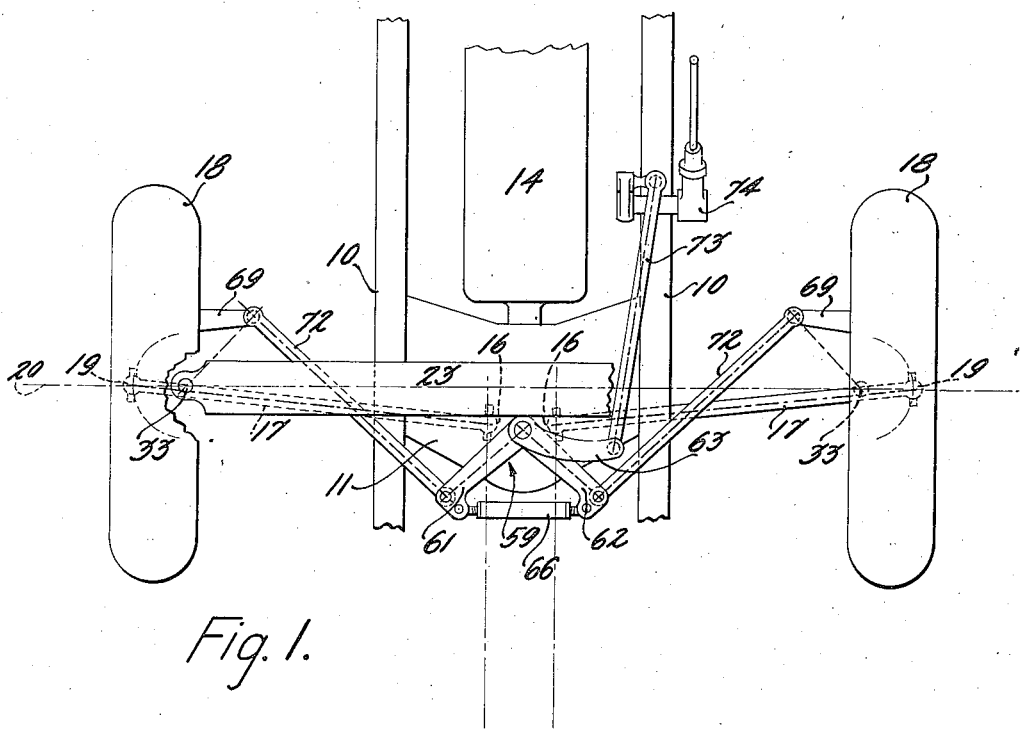
Figure 1 is a diagrammatic plan view of the invention illustrating the position of the elements during normal progression of the vehicle.

In the present instance with reference to the drawings 10 designates the longitudinal supporting frame of a vehicle to which is attached the front wheel steering and driving mechanism. A housing 11 is secured in any suitable manner between the two frame members 10, and supported in said housing is a conventional type of differential driving gear having a worm wheel 12 positioned centrally between the frame members and driven from a shaft 13 operated by an engine 14. The differential gear engages on either side, through a universal joint 16, a drive shaft 17 which drives the wheels 18 through a compound universal joint 19 of special construction located in the wheel hub 21.

Upon the housing 11 there is supported a transversely disposed leaf spring 23 which is secured thereon by a cap piece 24. The cap piece is clamped by the bolts 26 tightly against the edges of the spring leaves and is pulled down firmly against said housing by the vertical bolts 28, capscrews 29 being provided to maintain the spring firmly against its seat on the housing. A distance piece 31 is shown interposed between the spring and the capscrews 29, as ample space has been provided for the accommodation of different heights of springs. It will be seen that with the cross spring construction as herein featured the rigidity of the spring against horizontal movement is utilized to sustain the upper steering head 37 against horizontal deflection due to road shocks, tractive effort, etc., there being a tendency for the spring to slew around on its anchorage should a greater shock be imposed on one wheel than on the other. Accordingly the means above described have been provided for anchoring this spring on its supporting member.

On the wheel hub housing 32 there are formed upper and lower steering pivots members 33, 34 on which are mounted, by means of anti-friction bearings 36, (Fig. 4) the steering heads 37, 37ᵃ, said steering heads being provided with trunnions 38. The anti-friction bearings are of a type adapted to take both radial and thrust loads, the inner race being secured to the pivot members 33, 34 and the outer race secured in the heads 37, 37ᵃ, the latter by the nuts 39.

The ends of the springs are secured to the steering heads 37 by a spring end member 41 adapted to receive the trunnions 38 of the steering heads. The spring end member is bifurcated to afford clearance for the steering head 37 and engages several leaves at the end of the spring by means of the cross bars or abutments 43, 44.

Figure 3:
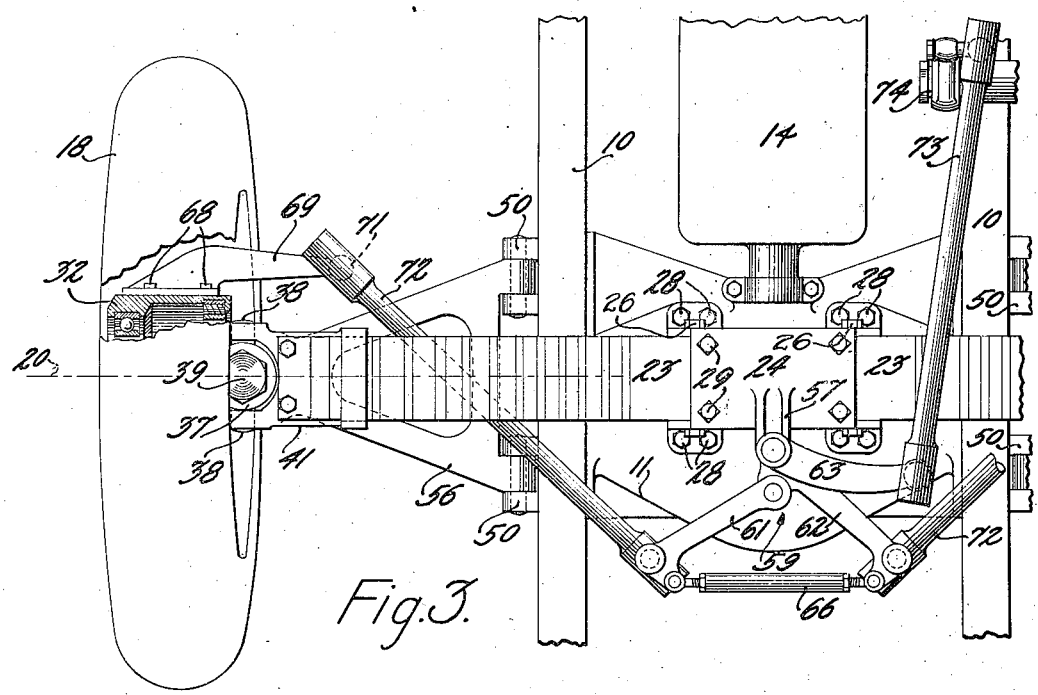
Figure 3 is a plan view of the invention on a larger scale than Fig. 1 and shows the construction of the elements and their assembled relation.
Figure 4:
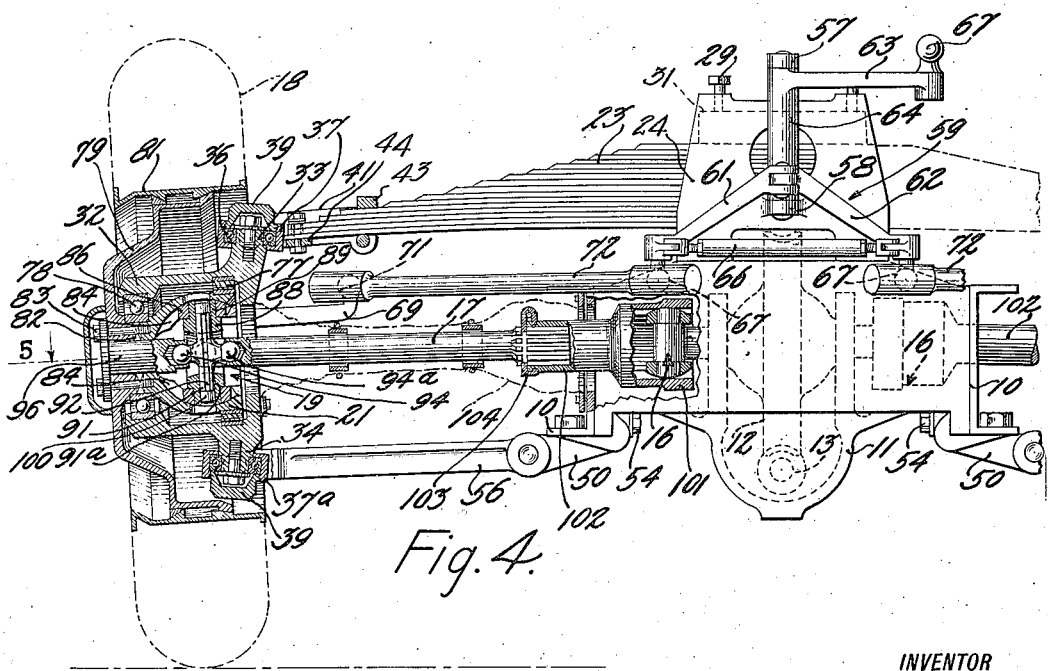
Figure 4 is a front elevation of Fig. 2 showing a vertical transverse section of the wheel and its driving mechanism in which some of the unimportant parts of construction have been simplified.
Figure 5:
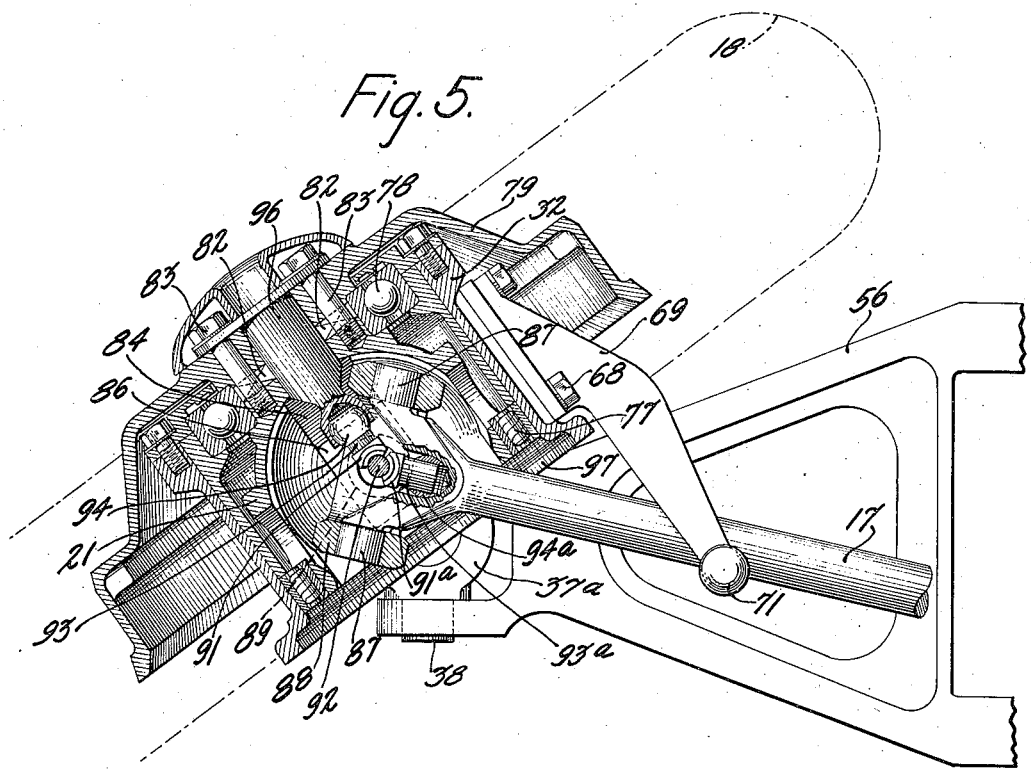
Figure 5 is a detail transverse section on an enlarged scale of the wheel taken on the line 5 of Fig. 4 looking in the direction indicated by the arrow.

Secured to the frame members 10 as by bolts 54 are the radius link anchorages 50 to which the radius links 56 are hinged rigid except for vertical oscillation. These radius links are secured to the lower steering head 37ᵃ by the trunnions 38 as shown in Figs. 3, 4, and 5. The lower steering heads are thus held in alignment and supported against lateral movement by the links 56.

By the above described structure comprising the spring attachment associated with the upper steering head and the radius link connected with the lower head, said heads are held in the desired alignment to the vehicle without resource to a load carrying axle structure connecting the wheels. Such an axle structure would be of undue weight and bulk in a chassis for the relatively large angles of wheel swing contemplated in this invention.

A steering mechanism comprises bracket portions 57, 58 formed on the cap piece 24 and in which is pivoted a bell crank 59 provided with levers 62 and 63 formed integral with a sleeve member 64, and a lever 61 which is pivoted on the sleeve and connected to the lever 62 in an adjustable manner by a turnbuckle 66. The steeering links 72 form a connection between the levers 61, 62 and the levers 69 secured to the wheel hub housings 32, and an operating link 73 connects the bell crank mechanism to a suitable steering gear 74.

The wheel hub 21, of generally spherical form, is rotatably mounted in the wheel hub housing 32 on the bearings 77, 78, and a wheel disk 79 adapted to support the rim 81 is secured to the hub 21 by the splines 82 and the screws 83. In the wheel hub 21 (Figs. 4 and 5) there is formed normal to the plane of rotation a pair of arcuate grooves 84 and in these grooves are located a pair of sliding blocks 86.

The outer ends of the drive shafts 17 are bifurcated and are provided with cross pins 87, and an intermediate member 88, having trunnions 89 engaging the sliding blocks 86, is pivoted on the cross pins 87. It will be appreciated that the incorporation of the sliding blocks produces a compound joint of much smaller diameter than would be possible if the pin type of construction were used for all three axes of orientation, since this last mentioned construction involves two intermediate members or rings.

In compound joints of the type shown it is necessary, in order to realize constant velocity ratio, to control the attitude of the intermediate member. The swing of this member on the drive shaft cross pins 87 must always be one-half of the amount of the angle of the shaft (in the same plane) relative to the driven member. The control means for maintainng this equal angle between the intermediate member and both the drive shaft and driven member is subject to considerable reactions from the driving load and as shown in the drawings there is provided a relatively rugged and at the same time so compact a structure as to be accommodated within a joint structure of moderate overall dimensions.

Accordingly there is slidably mounted in the bores of the trunnions 89 of the intermediate member 88, a two-part cruciform joint controlling member 91, 91ᵃ similar to that of the co-pending application hereinbefore mentioned and which is adapted for relative angular motion of its parts. The two parts 91 and 91ᵃ are hinged together upon a pintle 92 provided at either end with a head 100 and are maintained in their hinged relation by bores in the trunnion 89. The arms 93 and 93ᵃ (Fig. 5) of these joint controlling members 91, 91ᵃ have slidably mounted thereon the spherical members 94 and 94ᵃ, the sphere 94 being engaged in a member 96 which is a part fixed to the driven member or wheel hub 21, the sphere 94ᵃ being engaged in the drive shaft 17. It will be seen that the wheel hub and the drive shaft are thus provided with pivotal engaging means with the transverse arms of this cruciform joint controlling member. By this construction the effect of swinging the drive shaft to a certain angle will always be to move this joint controlling member and consequently the intermediate member 88 through one-half of that angle.

It will be understood that the arm 93ᵃ which engages the drive shaft and the arm 93 which engages the member 96 of the wheel hub 21 must be rigid with each other in the direction of swing of the intermediate member 88, and must also be hinged together about the transverse axis. In other words, the arms 93, 93ᵃ of this cruciform member must rigidly maintain their rectangular relationship and still be free for relative swing about the axes of the arms which engage the intermediate member. The drawings show the type of control member disclosed in my copending application in which this two-fold requirement is met by utilizing two similar portions swinging about a center pin provided with a head at either end which prevents relative end motion of the two portions, the halves of the assembled joint controlling member being restrained from separation by a running fit engagement in the hollow trunnions of the intermediate member 88, while approach of the two halves is prevented by a running fit engagement with the pintle 92.

It has been found, even with the structure of the showing, that in order to accommodate the extreme swing of the drive shaft 17, the opening 97 in the wheel hub 21 has to be of considerable size, involving in some cases the use of non-commercial size of bearings 77 at this point. It is difficult to provide for adequate thrust means in such relatively large bearings, but by a special structure as herein featured, a commercial size of bearing 78 may be used at the outer side of the wheel hub. In this construction the wheel disc is attached to the outer joint or wheel hub member 21 by the screws 83 which are adapted to lie within the inner race of the commercial size bearing 78. Owing to the new construction utilized for the joint, the lateral space it occupies when flexed to full angle is relatively small and accordingly the bearing just referred to clears the joint without having to be located unduly far beyond the plane of the wheel as has caused an objectionable projection of the wheel center in drives of the prior art.

Figure 2:
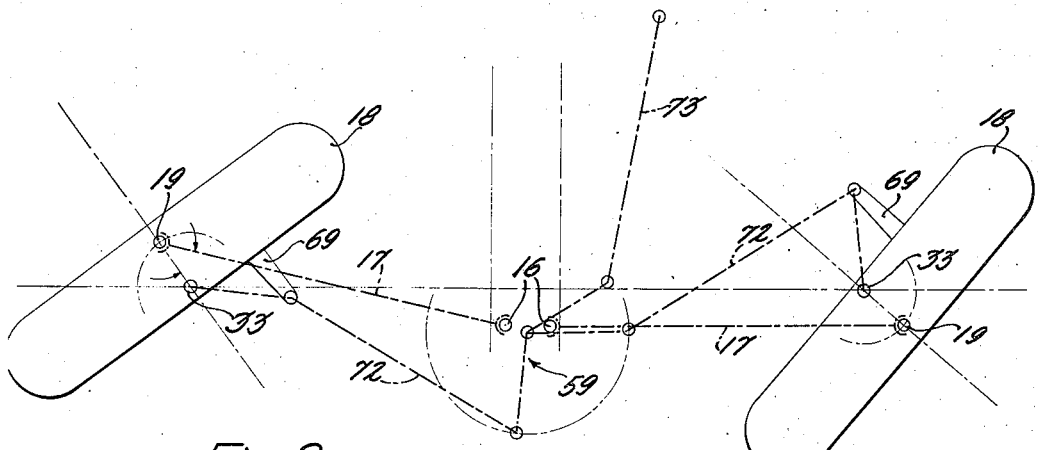
Figure 2 is a diagrammatic plan view similar to Fig. 1 illustrating the moved position of the elements during a steering operation.

It will be seen that the outer joint member or wheel hub to which the wheel is rigidly attached as described above is supported through the bearings 77, 78 in the wheel hub housing 32 which has limited movement in a horizontal plane for the steering of the vehicle. This housing 32 is provided as described hereinbefore with upper and lower steering pivots 33, 34 and in virtue of the special features here disclosed, these steering pivots may be disposed to the side of the wheel joints toward the center of the vehicle instead of otherwise, as is the usual custom. By the present construction the drive shafts change their angular relationship when the wheel is steered in such a way that the angle described by the shaft subtracts from the angle through which the wheels are steered and so reduces the angle through which the joints are flexed. It will be seen in Figs. 1 and 2 that the drive shafts 17 have a slight longitudinal movement when the wheels are steered, the universal joint 16, (Fig. 4) permitting of such movement.

With reference to Fig. 4 it will be seen that the universal joint 16 is constructed in the following manner: The differential drive shaft is provided with cross pins which are slidably engaged in longitudinal grooves in a casing 101 having an extending sleeve portion 102. This sleeve portion has a telescopic or splined attachment with the drive shaft 17. It will be noted that the end of the drive shaft lies slightly outside of the chassis frame 10. A detachable clamp 103 normally prevents end motion between the shaft 17 and sleeve 102, but upon withdrawal of this clamp the sleeve 102 and casing 101 may be moved along the shaft until withdrawn clear of the frame 10 whereupon the shaft may be orientated about the wheel joint.

Figure 6:
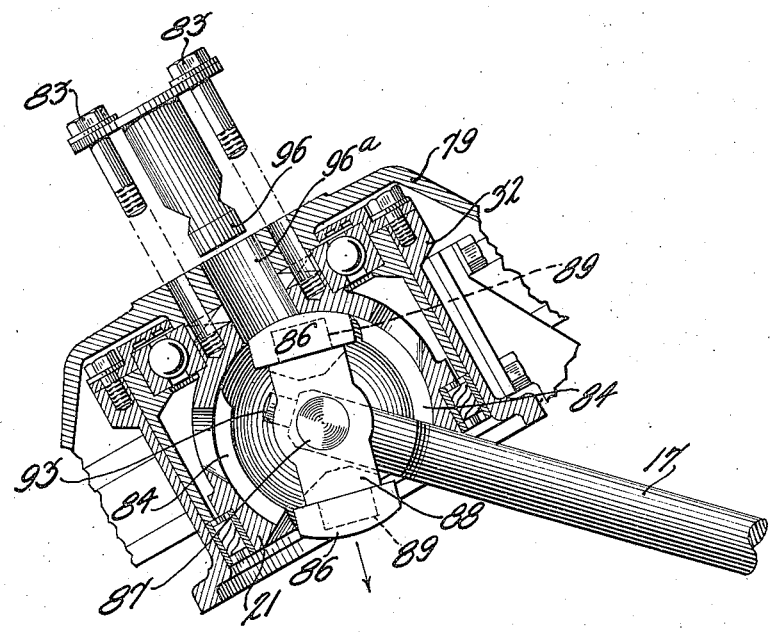
Figure 6 is a sectional view similar to Fig. 5 and illustrates the manner of removing the driving elements from the wheel hub.

There is illustrated in Fig. 6 the manner in which the drive shaft 17, intermediate member 88 and blocks 86 may be removed from the wheel hub 21 after the shaft has been withdrawn from its connection with the joint 16 as above described. The member 96 is withdrawn from the bore 96$^a$ as shown; this will permit of the intermediate member 88 together with the blocks 86 being moved around or disengaged from the grooves 84 and removed from the wheel hub in the direction indicated by the arrow without disturbing other parts, particularly without removing the wheel and without resource to a split driven member for the joint which would be less rugged and more bulky than the one-piece member featured.

A boot 104 constructed of flexible material has been provided as shown for the retention of oil and the exclusion of dust from the operating parts.

The means for supporting the lower steering head 37$^a$, which means are rigid except for vertical oscillation, have been indicated on the drawings in the form of a radius link, hinged to the frame at points well separated along the longitudinal axis. It is intended to be within the scope of this invention to substitute other means, rigid except for vertical oscillation, such as a flat leaf spring, which could conveniently be rigidly attached to the frame along a relatively long base to afford the necessary horizontal stability.

In the specific showing of the drawings pneumatic tires are indicated, and in the case of a road vehicle of considerable capacity it will be found that the necessary size of tire is associated with the relatively small rim diameter which limits the space available for the joint mechanism and the steering parts. For instance, at extreme steering angles such as contemplated in this invention, interference is apt to develop between the interior of the rim and the steering head support which in this case attaches to the cross spring. With a centrally located cross spring this interference would develop first towards the rear of the spring on account of the greater movement of the wheel in that direction. The spring 23 accordingly is set slightly to the front of the wheel axis 20 (Fig. 3) to compensate for the difference of wheel steering angle in the two directions.

Variations may be resorted to within the scope of the invention and portions of the improvements may be used without the others.

Having thus described my invention, I claim:—

1. In a vehicle having pivotally mounted wheels for steering so organized that when negotiating a curve the inner wheel is turned through a greater angle than the outer wheel, the combination of universal joint driving means for each wheel, and a lateral drive shaft for each wheel normally so disposed in plan aspect as to normally be midway between the extreme steered positions of the associated wheel axis.

2. In a vehicle having a wheel steerable through a different extreme angle to the right than to the left, a drive shaft, a universal joint means drivably connecting the wheel to the shaft, said shaft being normally so disposed in plan aspect as to bisect the extreme steered angles of the wheel.

3. In a front wheel drive vehicle, a pair of steerable wheels, a pair of universal joints therefor, a lateral shaft drivably connected to each joint, each shaft having its wheel end raked towards the rear of the vehicle to effect equal angular deflections on the joints at the extreme right and left hand steering positions notwithstanding a greater angle of the wheel at one position than at the other.

4. In apparatus of the class described, the combination of a pair of steerably mounted wheels, a universal joint in each wheel, a differential driving means disposed between the wheels, a universal joint on either side of the driving means and operated thereby, drive shafts connecting the universal joints of the wheels and of the driving means, the driving means joints in plan aspect being offset from the transverse line connecting the wheel axes by an amount sufficient to obtain equal angle between the shaft and wheel axes at either extreme of the steering movement notwithstanding the conventional variation in angle between the vehicle and the wheel in said extreme steered positions.

5. In a vehicle having wheels rotatably and steerably mounted, the combination of universal joints located laterally beyond the wheel steering axis with respect to the vehicle, and drive shafts so disposed in plan aspect as to normally bisect the extreme steered positions of the associated wheel axis.

6. A universal joint comprising, a drive shaft, cross pins thereon affording a first axis or orientation, an intermediate member pivoted on the cross pins, aligned trunnions on the intermediate member affording a second axis of orientation normal to the first said axis, blocks on said trunnions, a driven member provided with slots to permit of oscillation of said blocks and affording a third axis of orientation coaxial with the first.

7. A universal joint for a steerable wheel comprising, a drive shaft, cross pins thereon affording a first axis of orientation, an intermediate member pivoted on the cross pins, aligned trunnions on the intermediate member affording a second axis of orientation normal to the first said axis, blocks on said trunnions, a driven member provided with slots to permit of oscillation of said blocks and affording a third axis of orientation coaxial with the first, in combination with means adapted to maintain the intermediate member equidistant as to angular position from the driving and from the driven member.

8. Means for driving a steerable vehicle wheel comprising, a rotatably mounted wheel hub having an arcuate groove in an axis plane thereof, blocks adapted for oscillation in the groove and to drivably engage the same said blocks being provided with bores, an intermediate member having trunnions engaging said bores, a driving member, and a trunnion joint between the driving member and the intermediate member at right angles to the first said trunnions.

9. Means for driving a steerable vehicle wheel comprising, a rotatably mounted wheel hub having an arcuate groove in the axis plane thereof, blocks adapted for oscillation in the groove and to drivably engage the same, said blocks being provided with bores, an intermediate member having trunnions engaging said bores, a driving member, a pin joint between the driving member and the intermediate member, in combination with a controlling member having pivotally connected arms engaging the driving and driven members respectively, and each rigid with an arm engaging the intermediate member.

10. In a front wheel drive vehicle, a hollow hub member rigidly secured to a wheel and provided with arcuate grooves in the axial plane thereof, blocks drivably engaging said groove and having cylindrical bearings, an intermediate member provided with trunnions adapted to engage said bearings, a drive shaft having trunnions adapted to engage said intermediate member for oscillation and to drive the same, a controlling member having arms hinged about the axis of the trunnion and engaging the same, and other arms rigid with the first, and axially engaging the hub and the drive shaft.

11. A universal joint comprising, a rotatably mounted wheel hub having arcuate grooves in the axis plane thereof, blocks provided with bores and adapted for oscillation in the grooves and to drivably engage the same, an intermediate member having trunnions engaging said bores, a driving member, and a trunnion joint between the driving member and the intermediate member normal to the first said trunnions.

12. In a universal joint, the combination of, a hollow driven member having arcuate guides, means drivably engaging said guides and adapted for oscillation therein, an intermediate member pivotally engaging said means and a drive shaft having trunnions pivotally engaging the intermediate member at right angles to said pivots.

13. In apparatus of the class described, the combination of, a hollow rotationally driven member having arcuate grooves, means drivably engaging the grooves so as to afford a first axis of oscillation, an intermediate member pivotally engaging said means so as to afford a second axis of oscillation normal to the first, a drive shaft pivotally engaging the intermediate member so as to afford only a third axis of oscillation substantially coaxial with the first said axis.

14. A universal joint comprising, a hollow driven member having slots therein which provide driving faces disposed parallel to the axis plane of the driven member, an intermediate member engaging the slots for oscillation in the mid-plane thereof and for pivotal movement about an axis in that plane, in combination with a driving member pivotally drivably engaging the intermediate member for oscillation only coaxially with the first said oscillation.

15. In the art of connecting a driving and a driven member for uniform rotary motion with various angles of intersection between the axes of rotation, a rotary driven means having driving faces parallel to a plane containing the axis of rotation, an intermediate member engaging said faces for oscillation parallel to said plane and for oscillation about an axis therein, and a driving member drivably articulated to the intermediate member for single-axis oscillation.

16. In a universal joint having three axes of articulation two of which intersect the third, the combination of a driven member having grooves curved about a diameter coaxial with the axis of rotation, driving means engaging said grooves and fitted to the diameter thereof against end motion during normal oscillations, and means for permitting an abnormal degree of oscillation for the withdrawal of said driving means from the grooves.

17. A universal joint including, a hollow driven member having grooves curved on either side of a diameter of rotation, said driven member having an opening between the ends of the grooves of substantially less width than the diameter of the curvature, oscillating driving means engaging the circumference of the grooves in defeat of end motion during normal oscillation of the driving means within the grooves, and means to permit of an abnormal degree of oscillation for withdrawing the driving means through the opening set forth.

18. A universal joint comprising, a driving member, a driven member, an intermediate member having normally coaxial oscillating connections with said members and normally controlled to equal oscillation relative to each member, a controller normally engaging the three members set forth, in combination with means for severing one of said connections to permit of an abnormal oscillation of the intermediate member for the withdrawal thereof with its associated parts from the driven member.

19. A universal joint comprising, a driving member, a driven member, an intermediate member having normally coaxial oscillating driving connections with said members and normally controlled to equal oscillation relative to each member by a controller normally engaging the three members set forth, in combination with means for severing one of said connections, the whole so organized as to resist axial separation of the driving and the driven members during normal oscillation of the intermediate member and to permit of such separation upon an abnormal oscillation of the intermediate member.

20. In a vehicle having wheels rotatably and steerably mounted and driven by lateral shafts and universal joints, the combination of universal joints located beyond the wheel steering axis with respect to the vehicle, drive shafts disposed so as normally to bisect the extreme steered positions of the wheel axis, lever means carried by the vehicle, wheel connecting steering links diagonally traversing the wheel axes and articulated to the lever means and the wheels, two trunnion articulations and one track-and-slider articulation in the universal joint, and upper and lower vertically flexible members secured to the vehicle against horizontal movement, and extending laterally of the vehicle to engage the steerable wheel mounting.

Signed at Keyport in the county of Monmouth and State of New Jersey this 29th day of December A. D. 1924.

ROLAND CHILTON.